(12) United States Patent
Giaretta et al.

(10) Patent No.: US 7,940,779 B2
(45) Date of Patent: May 10, 2011

(54) METHOD AND SYSTEM FOR CONTROLLING MOBILITY IN A COMMUNICATION NETWORK, RELATED NETWORK AND COMPUTER PROGRAM PRODUCT THEREFOR

(75) Inventors: Gerardo Giaretta, Turin (IT); Ivano Guardini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1046 days.

(21) Appl. No.: 11/664,136

(22) PCT Filed: Sep. 30, 2004

(86) PCT No.: PCT/IB2004/003189
§ 371 (c)(1),
(2), (4) Date: Mar. 29, 2007

(87) PCT Pub. No.: WO2006/035261
PCT Pub. Date: Apr. 6, 2006

(65) Prior Publication Data
US 2008/0043758 A1    Feb. 21, 2008

(51) Int. Cl.
*H04L 12/56* (2006.01)
(52) U.S. Cl. ........ 370/400; 370/328; 370/329; 370/338; 370/331
(58) Field of Classification Search .................. None
See application file for complete search history.

(56) References Cited

U.S. PATENT DOCUMENTS

| | | | |
|---|---|---|---|
| 6,490,259 B1 * | 12/2002 | Agrawal et al. | 370/331 |
| 6,978,128 B1 | 12/2005 | Raman et al. | |
| 7,116,654 B2 * | 10/2006 | Kim | 370/338 |
| 7,149,229 B1 * | 12/2006 | Leung | 370/466 |
| 7,328,009 B2 | 2/2008 | Takeda et al. | |
| 2001/0053694 A1 * | 12/2001 | Igarashi et al. | 455/433 |
| 2002/0006133 A1 * | 1/2002 | Kakemizu et al. | 370/401 |
| 2004/0063402 A1 | 4/2004 | Takeda et al. | |
| 2005/0058099 A1 * | 3/2005 | Hernandez-Mondragon et al. | 370/331 |
| 2006/0019708 A1 | 1/2006 | Raman et al. | |
| 2007/0058673 A1 * | 3/2007 | Leung | 370/466 |

FOREIGN PATENT DOCUMENTS

| | | |
|---|---|---|
| CN | 1384648 A | 12/2002 |
| CN | 1486094 A | 3/2004 |
| EP | 1 134 991 A2 | 9/2001 |
| WO | WO-2004/010668 A1 | 1/2004 |

OTHER PUBLICATIONS

Notification of the First Office Action dated Dec. 11, 2009 from the Patent Office of the People's Republic of China in corresponding Chinese Patent Application No. 200480044311.2.

(Continued)

*Primary Examiner* — Nick Corsaro
*Assistant Examiner* — Michael T Vu
(74) *Attorney, Agent, or Firm* — Finnegan, Henderson, Farabow, Garrett & Dunner, L.L.P.

(57) ABSTRACT

A communication network, such as a mobile IP network, includes at least one mobile terminal and a plurality of home agents adapted to provide, within working sessions, communication services to the above mobile terminal. In the network, there is an authentication, authorization and accounting platform configured for identifying, within the above plurality, the home agent that serves the at least one mobile terminal in a selective and varying way within a single working session.

28 Claims, 7 Drawing Sheets

OTHER PUBLICATIONS

Communication pursuant to Article 96(2) EPC dated Jul. 23, 2007 from the European Patent Office in corresponding European Patent Application No. 04 769 525.9—2412.

Wakikawa et al.; "Inter Home Agents Protocol"; The Internet Society, MIP6/NEMO Working Group, Internet Draft, Retrieved from the Internet: URL:http://www.mobilenetorks.org/nemo/drafts/draft-wakikawa-mip6-nemo-haha-01.txt>,retrieved on Jun. 9, 2005, pp. 1-39, (2004).

Giaretta et al.; "MIP6 Authorization and Configuration Based on EAP"; The Internet Society, MIPv6 Working Group Internet Draft, Retrieved from the Internet: URL:http://bgp.potaroo.net/ietf/all-ids/drafts-giaretta-mip6-authorization-eap-01.txt>, retrieved on Jun. 8, 2005, pp. 1-25, (2004).

Jue et al.; "Design and Analysis of a Replicated Server Architecture for Supporting IP-Host Mobility", Mobile Computing and Communications Review, vol. 2, No. 3, pp. 16-23, (1998).

Harkin et al.; "The Internet Key Exchange (IKE)"; The Internet Society, Network Working Group, Request for Comments: 2409, pp. 1-41, (1998).

Giaretta et al.; "MIPv6 Authorization and Configuration Based on EAP"; The Internet Society, MIP6 Working Group, Internet Draft, pp. 1-35, (2004).

Perkins; "IP Mobility Support for IPv4"; The Internet Society, Network Working Group, Request for Comments: 3344, pp. 1-99, (2002).

Johnson et al.; "Mobility Support in IPv6"; The internet Society, Network Working Group, Request for Comments: 3775, pp. 1-165, (2004).

Thomson et al.; "IPv6 Stateless Address Autoconfiguration"; The Internet Society, Network Working Group, Request for Comments: 2462, pp. 1-25, (1998).

Calhoun et al.; "Diameter Base Protocol"; The Internet Society, Network Working Group, Request for Comments: 3588, pp. 1-147, (2003).

Kaufman; "Internet Key Exchange (IKEv2) Protocol"; The Internet Society, Internet Draft, Obsoletes: 2407, 2408, 2409, pp. 1-109, (2004).

Aboba et al.; "Extensible Authentication Protocol (EAP)"; The Internet Society, Network Working Group, Request for Comments: 3748, pp. 1-67, (2004).

Aboba et al.; "Extensible Authentication Protocol (EAP) Key Management Framework"; The Internet Society, EAP Network Working Group, Internet Draft, Category: Informational, pp. 1-73, (2004).

Patel et al.; "Authentication Protocol for Mobile IPv6", The Internet Society, Network Working Group, Internet-Draft, pp. 1-18, (2004).

* cited by examiner

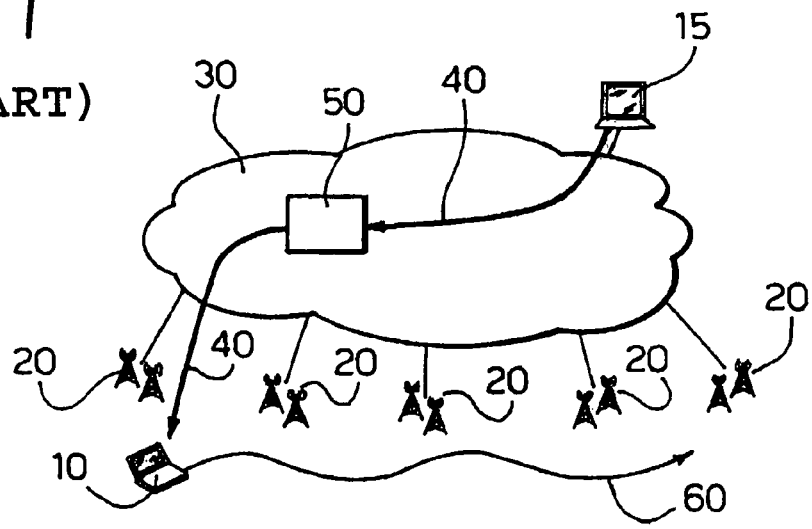
Fig_1
(PRIOR ART)
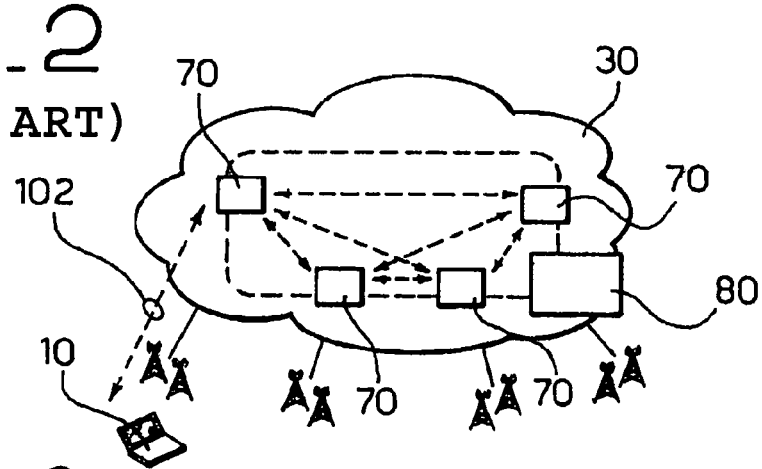
Fig_2
(PRIOR ART)
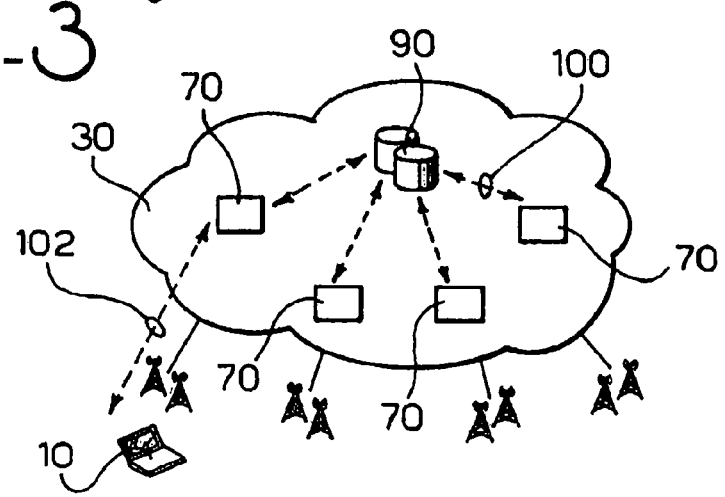
Fig_3

Fig._4
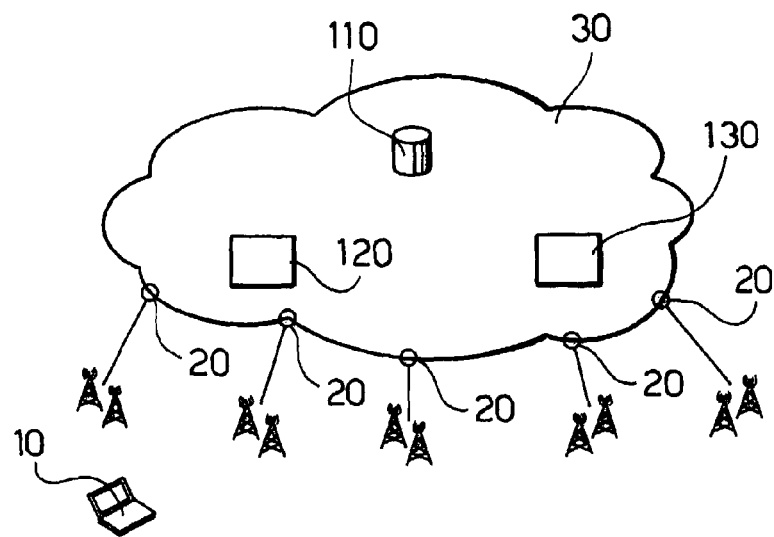
Fig._5
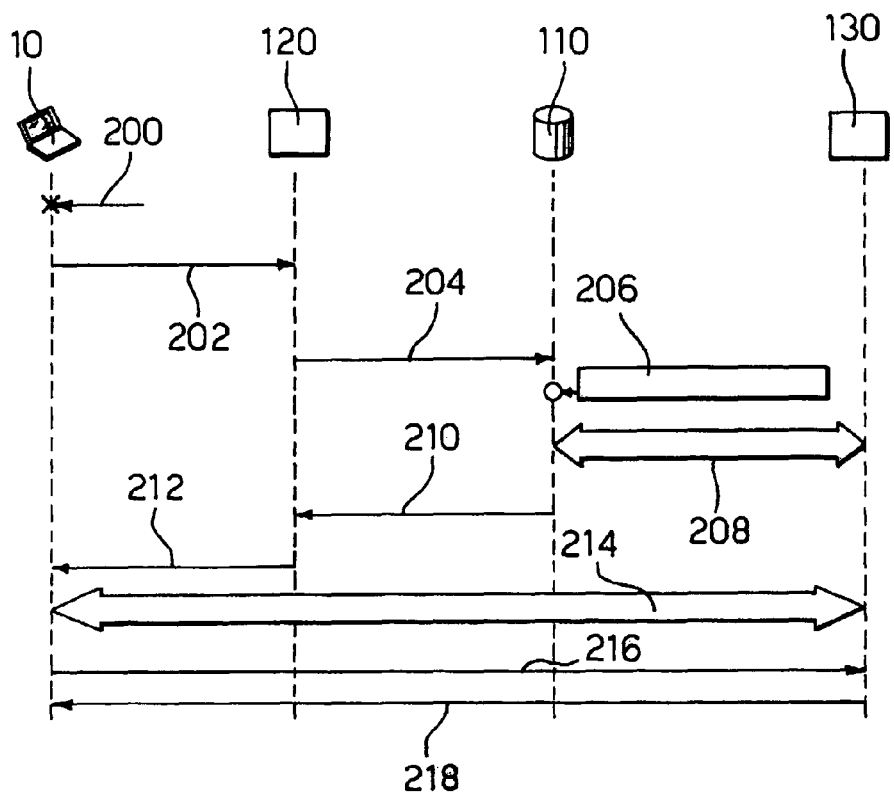

Fig_6
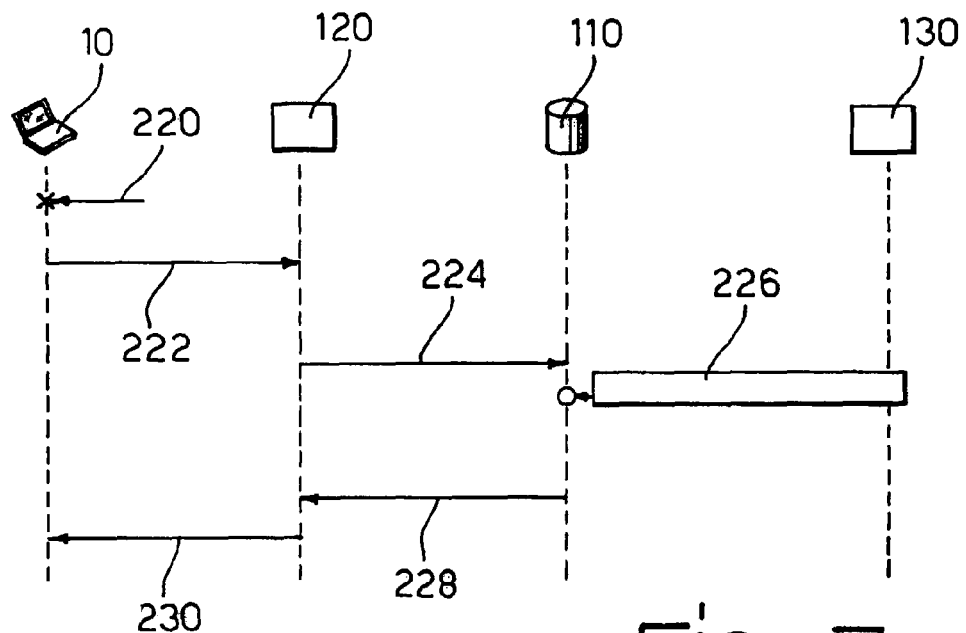
Fig_7
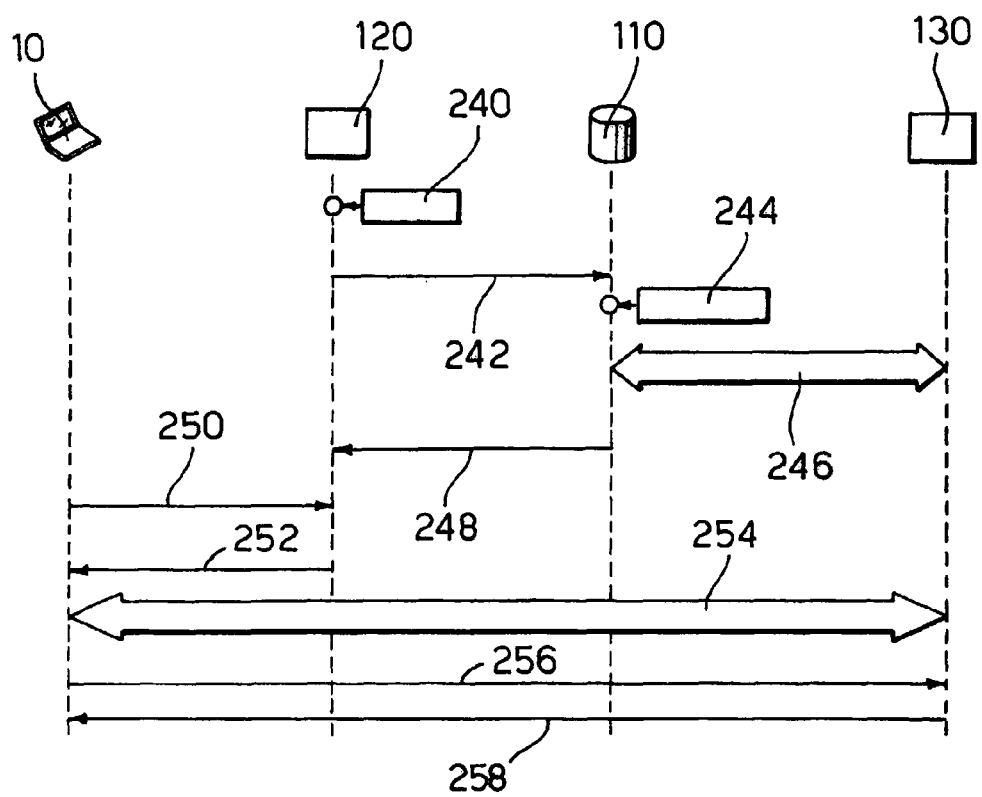

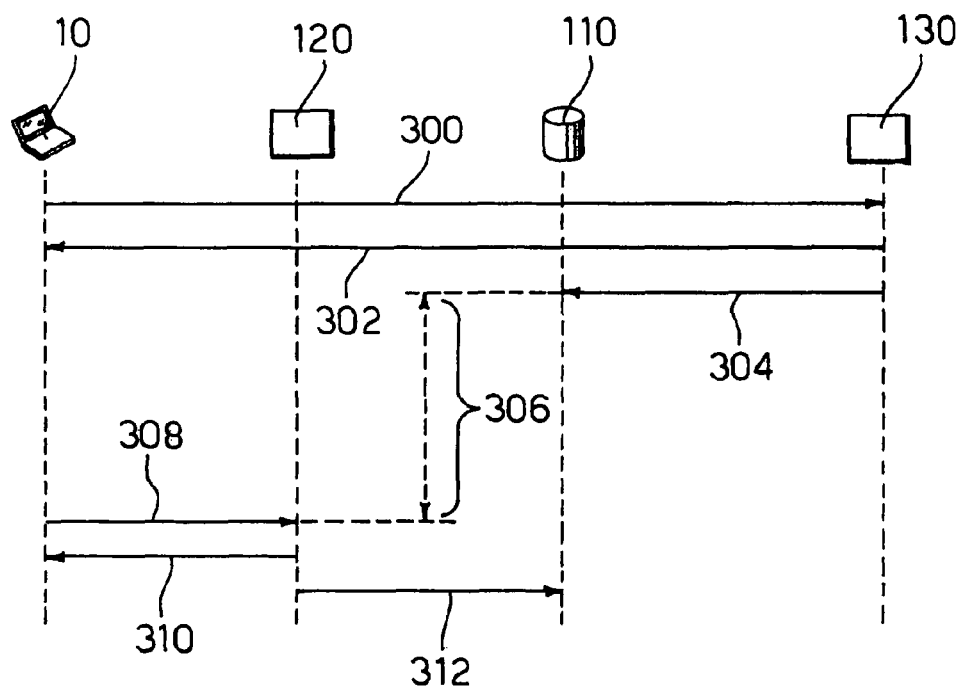
Fig_10
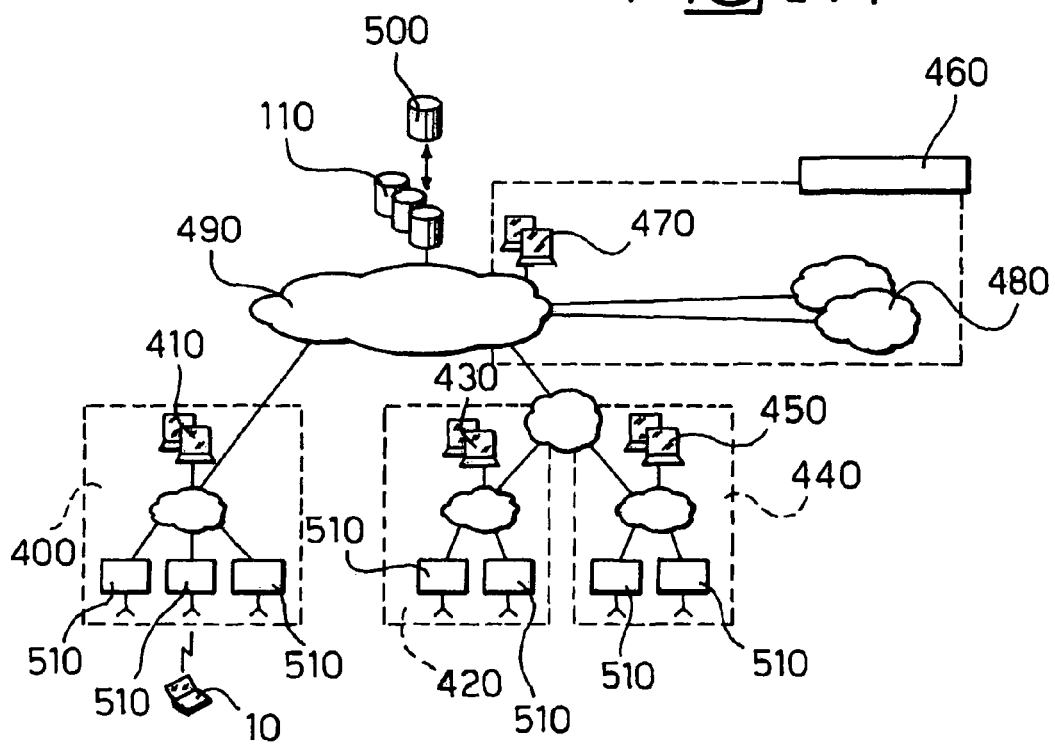
Fig_11

Fig._12
| Zone ID | ① | ② | ③ | Roam. |
|---|---|---|---|---|
| ① | 1 | 3 | 3 | 3 |
| ② | 3 | 1 | 2 | 3 |
| ③ | 3 | 2 | 1 | 3 |
| Roam | 3 | 3 | 3 | 1 |
Fig._13
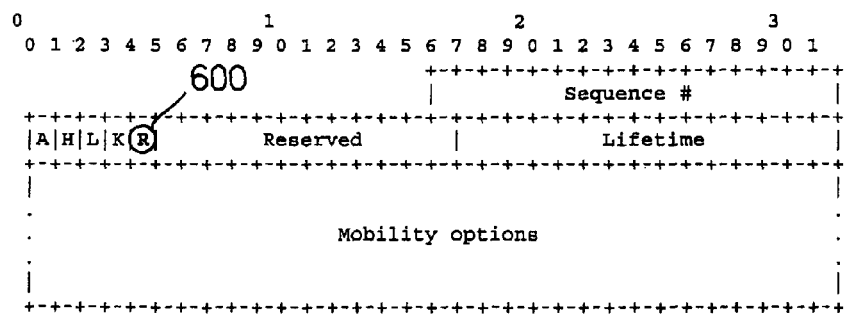
Fig._14
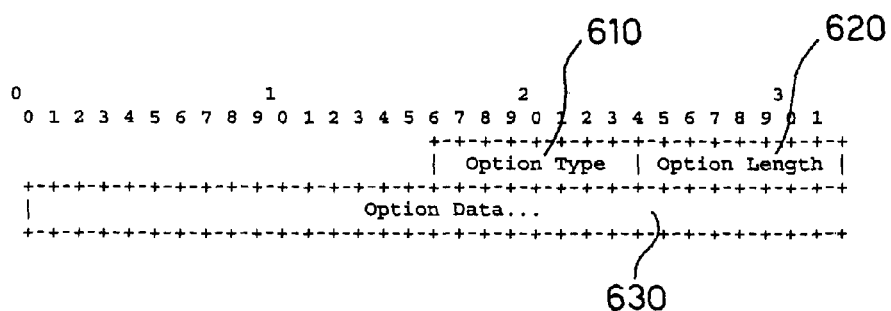

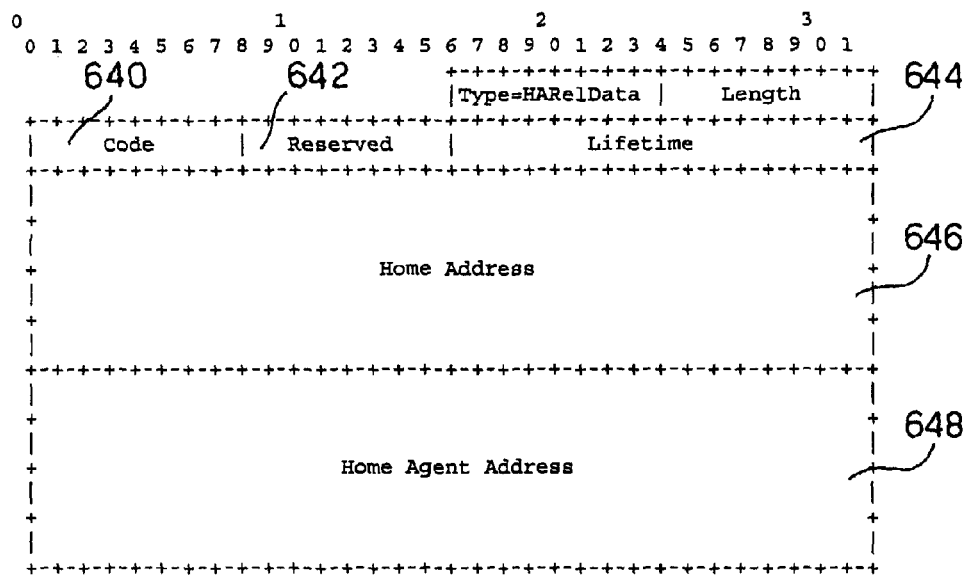
Fig_15
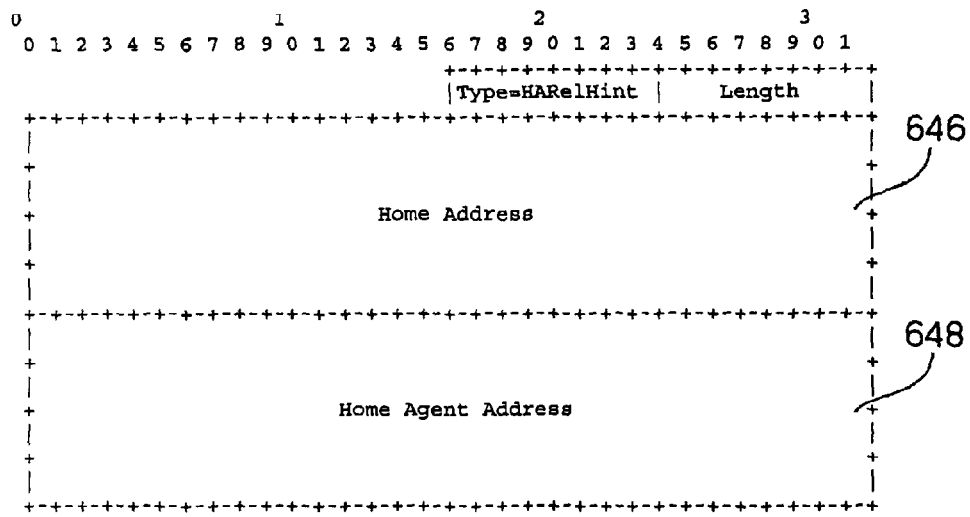
Fig_16

METHOD AND SYSTEM FOR CONTROLLING MOBILITY IN A COMMUNICATION NETWORK, RELATED NETWORK AND COMPUTER PROGRAM PRODUCT THEREFOR

CROSS REFERENCE TO RELATED APPLICATION

This application is a national phase application based on PCT/IB2004/003189, filed Sep. 30, 2004, the content of which is incorporated herein by reference.

FIELD OF THE INVENTION

The present invention refers to techniques for managing traffic in telecommunications networks.

The invention has been developed paying particular care to the possible application in mobile networks based on IP (Internet Protocol), namely, in a more accurate way, in networks where terminal mobility is managed with the Mobile IP protocol.

In any case, reference to this particular field of application must not be intended in a limiting sense for the scope of the invention.

DESCRIPTION OF THE PRIOR ART

IP mobile networks identify a scenario in which a mobile user moves inside the network and generates traffic that is routed inside the network towards the nodes (corresponding nodes) with which the user is communicating.

During his movements, the user may have to change the access network (sub-network) that allows him to use IP services. This operation must be transparent for the user so that he can go on communicating with the corresponding nodes without interruptions.

Traditional protocols on which IP networks are based, due to their nature, are not able to manage IP terminals moving inside the network. In order to fill this gap, the IETF (Internet Engineering Task Force) standardisation body has defined the Mobile IPv6 protocol, that allows IPv6 mobile terminals to change their point of attachment to the network transparently with respect to the applications.

The Mobile IPv6 protocol is specified in document rfc3775. This is the first of different references made in the present description to standards or norms of the draft- . . . or rfc . . . types: their related information are available to the public on the filing date of the present application on the IETF web site at address http://www.ietf.org or, alternatively, in the on-line data base http://www.watersprings.org.

In case the Mobile IPv6 protocol is adopted, two IP addresses are assigned to the mobile node. The first address is its Home Address (HoA): this address never changes and is used to univocally identify the identity of the node (herein below also called mobile node or terminal). The second address is the so-called Care-of Address (CoA): this address identifies the actual mobile terminal position within the visited sub-network and then changes upon every movement from one sub-network to another.

Every movement that implies a change of visited IP sub-network compels the mobile terminal to record its own Care-of Address by a server, called Home Agent (HA), that can be found in its provider's network (also called "home network"). Any other IP terminal that tries to communicate with the mobile node, contacts the mobile node itself by using the Home Address. Through the normal IP routing, the sent traffic reaches the HA, that re-addresses it towards the actual position of the mobile node, identified by the Care-of Address. In this way, all traffic aimed to the mobile node is dispatched by the Home Agent towards the current user address, namely the Care-of Address. Then, the mobile node can be constantly able to be reached whichever its point of attachment to the network is.

FIG. 1 shows a generic scenario of use of the Mobile IPv6 protocol inside the IP network that houses a mobile node.

In particular, in FIG. 1 a mobile node 10 has available a series of access points 20 that allow it to establish a connection with the network 30 of its provider and, more in detail, allow it to open a communication session, designated with 40, through a particular server 50 called Home Agent. The communication session 40 implies, in the shown example, receiving data traffic from a corresponding node, designated with 15. The mobile node 10 motion inside the IP network is pointed out by arrow 60. The Home Agent 50 guarantees that the traffic generated by the corresponding node 15 reaches the mobile node 10 whichever the current point of attachment of the mobile node is.

Placement and load level of the Home Agent 50 greatly affect the performance experimented by the mobile terminal, since they affect both the delay with which the mobile node receives the data traffic and the length of the temporary loss of connectivity (handoff latency) that occurs after every movement from an access point to another.

It is known [ref. draft-giaretta-mip6-authorization-eap-00] that it is possible to dynamically assign to the mobile terminal, for example when turning it on, a Home Agent that is able to provide optimum performance, namely a Home Agent that has available enough processing resources and can be found as near as possible, in terms of number of IP hops, to the mobile terminal point of attachment.

However, in time, the Home Agent, initially assigned according to these criteria, may not be any more able to provide a service with adequate quality. For example, this could occur in the following situations:

following continuous movements of the mobile terminal, it is possible that the Home Agent ends up being rather far away from the current point of attachment of the mobile terminal itself; this causes a great increase of the handoff latency and the traffic transfer delay to its destination;

when the amount of traffic generated by the mobile terminals that can be found in the network changes, it is possible that the Home Agent is subjected to a congestion state, with the consequent incapability of managing all mobile terminals connected thereto.

In order to solve this problem, an arrangement is known that is called Inter Home Agents Protocol (HAHA) [ref. draft-wakikawa-mip6-nemo-haha-01], that allows the mobile node to change the Home Agent being used moment by moment, bearing every time upon the apparatus that is able to guarantee the best performance.

The architecture on which the Inter Home Agents Protocol solution is based, shown in FIG. 2, provides that the mobile node 10 is served, instead of by a single Home Agent 50 (as in the case shown in FIG. 1), by a group of Home Agents 70 arranged inside the operator 30 network. All Home Agents 70 belonging to the same group periodically exchange signalling messages to synchronise information about position (namely Home Address and Care-of Address) of mobile nodes that can be found inside the network.

Due to this synchronisation procedure, the Home Agents belonging to the same group are seen by the mobile node 10 as a single "virtual" Home Agent 80, which means that the mobile node 10 can be moved from one Home Agent to the other without modifying its own Home Address, namely with a minimum impact on current communications.

This approach, however, has limitations that can make its application difficult, especially in case of big-sized networks (for example big providers/operators with a meaningful number of Home Agents):

- every Home Agent must be manually configured [ref. draft-wakikawa-mip6-nemo-haha-01, page 17] with the addresses of all other Home Agents belonging to the same group. This makes service management and supply complicated, especially when the number of Home Agents that can be found in the network is great;
- in order to allow the mobile node to keep the same Home Address independently from the Home Agent being used every moment, the Home Agents belonging to the same group must exchange, in a peer-to-peer mode, a high number of signalling messages, that are necessary for synchronising the binding tables between Home Address and Care-of Address. This limits the scalability of the arrangement, increasing the waste of resources, such as, for example, bandwidth resources, in network connections and the computation load on Home Agents.

Herein below, for completeness, the background documentation, cited as reference, is included. They mostly are IETF standards and/or working documents.

Mobility support for IPv6 (rfc3775);
IP Mobility Support for IPv4 (rfc3344);
IPv6 Stateless Address Auto-configuration (rfc2462);
Diameter Base Protocol (rfc3588);
The Internet Key Exchange (rfc2409);
Internet Key Exchange (IKEv2) protocol (draft-ietf-ipsec-ikev2-15)
Extensible Authentication Protocol (rfc3748);
EAP Key Management Framework (draft-ietf-eap-keying-03);
MIPv6 Authorisation and Configuration based on EAP (draft-giaretta-mip6-authorization-eap-00);
Authentication Protocol for Mobile IPv6 (draft-ietf-mip6-auth-protocol-00)

OBJECT AND SUMMARY OF THE INVENTION

From the previous description of the current situation, it appears that there is a need for defining a technique that allows modifying in real time, and with a minimum impact on current communications, the Home Agent being used by a mobile terminal.

Object of the present invention is satisfying the above need and in particular the invention deals with the problem of providing a solution that has not the critical points of the Inter Home Agents Protocol, and can be used to enable the mobile terminal to be always served by a Home Agent that is able to provide optimum performance, without causing any disruption of user services.

According to the present invention, this object is obtained by means of a method having the characteristics included in the following claims. The present invention also deals with a corresponding system, a network comprising such system, in addition to a computer program product that can be loaded in the memory of at least one computer and comprising portions of software code to actuate the above method. As used herein, the reference to such computer program product is meant as equivalent to the reference to means readable by a processor containing instructions for controlling a computer system in order to coordinate the performance of the method according to the invention. The reference to "at least one computer" is aimed to point out the possibility that the present invention is put to practice in a distributed and/or modular way.

An embodiment of the currently preferred invention is applied to the supply of communication services to at least one mobile terminal in a communication network comprising a plurality of Home Agents, in which the at least one mobile terminal is served by a Home Agent identified within the above plurality. The services are supplied to the mobile terminal within working sessions in a situation in which:

- in the communication network an Authentication, Authorisation and Accounting (AAA) platform is provided, and
- the Home Agent that serves the mobile terminal is identified within the above plurality through the AAA platform in a selective and changing way within a single working session.

The above preferred embodiment implies, among the others, the following advantages:

- performance optimisation: the assignment of a Home Agent closer to the mobile node allows optimising the performance experimented by the user, reducing the handoff latency and the transfer delay of traffic routed through the Home Agent;
- load balancing: the chance of modifying the Home Agent being used by a certain user allows intervening in real-time on the load division among the Home Agents being present in the network, in order to adapt it to the type and the amount of traffic generated by the users. For example, in order to prevent the occurrence of a congestion state, it is possible to dynamically decrease the load level of a certain Home Agent making one or more mobile nodes served by another Home Agent;
- optimum use of operator network resources: the assignment of a Home Agent closer to the mobile node allows reducing the amount of traffic that crosses the operator network (for example the backbone). In particular, this guarantees an optimum exploitation of network resources, avoiding that the traffic related to mobile nodes uselessly transits through the geographic connections composing the operator backbone.

BRIEF DESCRIPTION OF THE DRAWINGS

The invention will now be described, as a non-limiting example, with reference to the enclosed figures of drawings, in which:

FIGS. 1 and 2 have already been previously described;

FIG. 3 shows a possible network architecture of the herein-described arrangement;

FIG. 4 shows in more detail the network architecture of the herein-described arrangement;

FIG. 5 shows a functional flow diagram representing a procedure for re-allocating the Home Agent started by mobile node and successfully ended;

FIG. 6 shows a functional flow diagram representing a procedure for re-allocating the Home Agent requested by the mobile node but refused since it was not authorised;

FIG. 7 shows a functional flow diagram representing a procedure for re-allocating the Home Agent started by the Home Agent currently-used by the mobile node and successfully ended;

FIG. 10 shows the procedure closure through accounting messages;

FIG. 11 shows a possible division into zones of an operator network;

FIG. 12 shows a metrics example among the zones into which an operator network can be divided;

FIG. 13 shows a possible new format of the Binding Update message that can be used in the context of the herein-described arrangement;

FIG. 14 shows the generic format of a Mobility Option that can be used in the context of the herein-described arrangement;

FIG. 15 shows a possible format of a Home-Agent-Relocation-Data-Mobility-Option that can be used in the context of the herein-described arrangement; and FIG. 16 shows a possible format of a Home-Agent-Relocation-Hints-Mobility-Option that can be used in the context of the herein-described arrangement.

DETAILED DESCRIPTION OF EMBODIMENTS OF THE INVENTION

Figure 8:
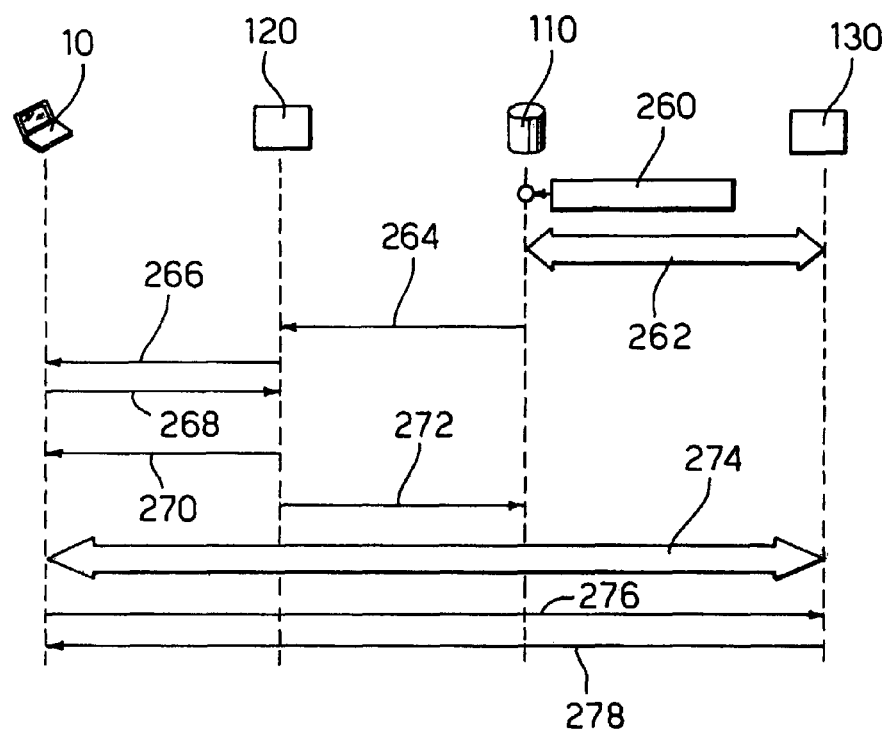
FIG. 8 shows a functional flow diagram representing a procedure for re-allocating the Home Agent started by the AAA server and successfully ended.

FIG. 3 shows with direct reference to the diagrams already shown in FIGS. 1 and 2 an example of network architecture on which the herein-described arrangement is based.

The architecture in FIG. 3 provides for the use of the Authentication, Authorisation and Accounting (AAA) platform 90 of the provider with which the user subscribed the service. This in order to make such platform, already normally present in the provider 30 network, authorise, drive and monitor the whole migration process towards a new Home Agent (Designated Home Agent), by sending configuration commands and information to the Home Agents 70, present in the network, and to the mobile node 10. Communication between Authentication, Authorisation and Accounting (AAA) platform 90 and mobile node 10 is performed with the support of the Home Agent that is currently serving the mobile node (namely the Serving Home Agent) through suitable extensions in the AAA protocol, designated with 100 in FIG. 3, and in Mobile IPv6 signalling messages, designated with 102 in FIG. 3.

Each one of the Home Agents 70 present in the network thereby operates independently from the others and manages its own addressing space. Consequently, the mobile node 10 modifies its own Home Address upon every Home Agent change. Survival of application sessions is guaranteed by providing a transitional period during which the mobile node 10 can simultaneously use the old and the new Home Addresses, so that the applications started before the beginning of the reallocation procedure can end without interruptions.

Operating in this way, though increasing the complexity of the mobile node 10, that must be able to simultaneously communicate with the old (Serving) and the new (Designated) Home Agent, it is not necessary to provide any exchange of information for coordinating the Home Agents being present in the network. An increase of system scalability and a reduction of signalling overhead are thereby obtained.

The Mobile IPv6 (MIPv6) protocol is the solution, proposed within IETF (Internet Engineering Task Force), to manage the wide-range mobility of a terminal among IPv6 networks [ref. rfc3775].

The relevant protocol allows a mobile node 10 both to access a network from different positions, preserving a single identity, and to dynamically change the point of attachment keeping the existing connections active.

As already stated, the protocol manages the mobile node mobility introducing:
  two different IPv6 addresses for every mobile node, namely Home Address and Care-of Address, and
  an agent, called Home Agent (HA).
Of the two different addresses:
  i) the first one, namely the Home Address (HoA), is an address assigned by the provider with which the user subscribed the service; this address never changes (at least for the whole working session length) and is used to univocally identify the mobile node identity;
  ii) the second, namely the Care-of Address (CoA), is an address belonging to the visited network, dynamically obtained by the mobile node through IPv6 auto-configuration [ref. rfc2462]. This address locates the current mobile node position and for such reason changes upon every movement of the mobile node itself.

The Home Agent resides in the provider network with which the user subscribed the service (the so-called "home network") and its task is re-addressing the traffic aimed to the mobile node 10 (namely the traffic addressed to the Home Address) to the current position of the mobile node itself (namely the Care-of Address or CoA).

Though Mobile IPv6 also introduces a communication mode, called Route Optimisation, that provides for the direct communication between mobile node 10 and corresponding node 15, without the traffic passing through the Home Agent 50, the Home Agent 50 position is particularly important for the correct operation of protocol and the performances experienced by the mobile node.

In fact, the Round Trip Time (RTT) between mobile node 10 and Home Agent 50 and, therefore, their distance, greatly affect the handoff latency, namely the time interval during which, following a handoff, the mobile node is not able to receive and send packets.

Moreover, if the communication between mobile node 10 and corresponding node 15 occurs in Bi-directional Tunnelling mode (e.g. if the corresponding node 15 does not support the extensions provided by Mobile IPv6), all data traffic must pass through the Home Agent 50 and therefore this latter one's position depending on the mobile node 10 position strongly affects the transfer delay to which the data traffic is subjected.

The arrangement described here allows assigning to the mobile terminal, upon its turning on, a Home Agent that is able to provide optimum performance, namely a Home Agent that is as near as possible, in terms of number of IP hops, to the mobile terminal connection point. This can be obtained by using some of the arrangements available in literature to dynamically configure the Mobile IPv6 terminals upon their entry in the network, such as for example the arrangement disclosed in [ref. draft-giaretta-mip6-authorization-eap-00].

When, due to its continuous movements, the mobile node greatly goes away from its own Home Agent (Serving Home Agent) and experiences a decay in Mobile IPv6 protocol performances, the herein-described arrangement allows assigning the mobile node a new Home Agent (Designated Home Agent) that is able to provide better performances than the previous one (Serving Home Agent).

Everything without causing any disruption of on-going applications and within a procedure performed under the control of the provider with which the user subscribed the service (home provider), that must authorise the Home Agent change.

FIG. 4 shows the general scenario and the elements of architecture on which the proposed arrangement depends.

In particular, the following are pointed out:

an Authentication, Authorisation and Accounting server 110 of the mobile node home provider (namely the AAA server of the provider with which the user subscribed the service). On the server 110, substantially corresponding to the platform pointed out with 90 in FIG. 3, there is a module whose function is authorising, controlling and monitoring the Home Agent reallocation procedure, sending configuration commands and information to the mobile node 10 and the Home Agents 70 being present in the network;

a Serving Home Agent 120, namely the Home Agent that is serving the mobile node 10. On the Home Agent 120 there is a module that interacts with the Authentication, Authorisation and Accounting server 110 and acts as an intermediary for communications with the mobile node 10;

a Designated Home Agent 130, namely the Home Agent designated to serve the mobile node 10. On the Home Agent 130 there resides a module that is able to receive from the Authentication, Authorisation and Accounting server 110 the configuration information for the usage of the Mobile IPv6 service by the authorised users (e.g. Home Address, cryptographic material, granted privileges);

a mobile node 10, namely the mobile node on which there resides a module that interacts with the Authentication, Authorisation and Accounting server 110 through the Serving Home Agent 120 and ensures the survival of application sessions during the Home Agent reallocation procedure.

The mechanism through which the migration from Serving Home Agent 120 to Designated Home Agent 130 is managed is based on the following technical approach.

The mobile node 10 declares to support the Home Agent change without impacts on current communications (namely in a "seamless" way) in Binding Update messages that it sends to its own Home Agent, using one of the Reserved bits provided in [ref. rfc3775, page 39-41]: Home Agent 120 and server 110 are then able to recognise which mobile nodes are able to complete the procedure.

The procedure can be started either from the mobile node 10, or from the Serving Home Agent 120, or still from the AAA server 110 of the home provider.

In the first two cases, the procedure is anyway authorised by the AAA server of the home provider 110.

In particular:

i) the mobile node can request the start of a Home Agent reallocation if it detects the existence of a Home Agent that could guarantee better performance (e.g. discovery of a Home Agent in its own link through the reception of a Router Advertisement message with bit H=1 [ref. 3775, page 61-62]);

ii) the Serving Home Agent 120 can activate the procedure in case of overload;

iii) the Authentication, Authorisation and Accounting server 110 can give rise to the Home Agent reallocation procedure in order to provide the mobile node 10 with a Home Agent 130 that allows better performance, usually characterised by a shorter distance in terms of IP hops from the mobile node 10: in order to do so, the Authentication, Authorisation and Accounting 110 server keeps track of all Home Agents being present in the network, of which mobile nodes each one of them is serving and of the position of the mobile nodes themselves.

The communication of new configuration parameters to the mobile node 10. (namely the Designated Home Agent address, the new Home Address and the related Security Associations) is obtained by defining new Mobility Options [ref. rfc3775, page 46-47] inside the Binding Update (BU) and Binding Acknowledgement (BA) messages: this approach has the advantage of freeing the start of the Home Agent reallocation procedure from re-authentication events. Communication with mobile node 10 can occur completely asynchronously (namely, it can be started at any time).

The survival of application sessions is guaranteed by introducing a mechanism for managing addresses that is similar to the one provided for the "stateless auto-configuration" procedure of IPv6 networks [ref. rfc2462]: every Home Address is associated to a state that points out whether the address can be used for starting new communications or whether it can be used only for ending existing communications.

Independently from which node activates the procedure, a mechanism is provided through which the mobile node 10 communicates to the network 30 if it supports the Home Agent reallocation procedure and, in particular, the change of Home Agent without impacts on current communications. In fact, the procedure of the proposed arrangement provides that, for a certain period, the mobile node 10 simultaneously uses two Home Addresses and, then, two Home Agents (120 and 130); this, in particular, implies that the mobile node 10 starts and maintains two IPsec Security Associations with two different nodes.

It can happen, therefore, that not all mobile nodes are configured to support this new functionality. Further, a terminal (e.g. PDA) can be unable to support the procedure because it has a limited processing capability or a reduced memory space.

For this reason, every mobile node that supports the Home Agent reallocation procedure communicates this capability thereof to the network, for example setting to 1 a bit in Binding Update messages (bit R designated with 600 in FIG. 13) that it sends to its own Home Agent; in this way, the Serving Home Agent 120 is always knowing which mobile nodes are able to change Home Agent without impacts on current communications. These information, if necessary, are sent by the Serving Home Agent 120 to the Authentication, Authorisation and Accounting server 110.

As previously observed, the Home Agent reallocation procedure can be started by the mobile node.

The mobile node can request the start of the procedure when it receives a Router Advertisement (RA) message with bit H set to 1: this means, in fact, that in the link where it is, there is a Home Agent.

The Authentication, Authorisation and Accounting server can decide authorising, or not authorising, the request coming from the mobile node 10 depending on the current network status and the user service profile.

In case the request is authorised, the whole procedure is described in FIG. 5:

in a step 200 the mobile node 10 receives a Router Advertisement with bit H set to 1 and decides to start a Home Agent reallocation procedure;

in a step 202 the mobile node 10 sends a Binding Update (BU) message to its own Serving Home Agent 120, in which it appends a new Mobility Option, called HA-Relocation-Hints-Mobility-Option. This option is a Home Agent reallocation request and contains:

a) the address of the Home Agent that sent the Router Advertisement;

b) the address that the mobile node 10 configured in the visited link and that could be the new Home Address;

in a step 204 the Home Agent processes the Binding Update message as stated in [ref. rfc3775, page 88-92]; in case a HA-Relocation-Hints-Mobility-Option is present, the Home Agent sends to the Authentication, Authorisation and Accounting server 110 a Diameter message of Home Agent Relocation Request comprising the following AVP (Attribute Value Pair) attributes:

a) User-Name-AVP containing the Network Access Identifier of the user requesting the procedure activation. The Network Access Identifier is the identifier used by the user during authentication; in general it is of the user@domain type. The Serving Home Agent 120 knows the Network Access Identifier of the mobile node that required the start of the Home Agent reallocation procedure, since it shares therewith an IPsec Security Association [ref. draft-giaretta-mip6-authorization-eap-00, page 19];

b) Serving-Home-Address-AVP containing the Home Address currently assigned to the mobile node;

c) Designated-Home-Agent-Address-AVP and Designated-Home-Address-AVP, respectively containing the address of Designated Home Agent and the new Home Address (HoA) suggested by the mobile node in the previous HA-Relocation-Hints-Mobility-Option;

in a step 206 the Authentication, Authorisation and Accounting server 110 checks whether the mobile node 10 is authorised to carry out the Home Agent reallocation procedure; in case the answer is affirmative, it selects a Designated Home Agent 130, possibly the one pointed out by the mobile node 10 (the indications provided by the mobile node in the HA-Relocation-Hints-Mobility-Option are interpreted as a simple suggestion, which means that the Authentication, Authorisation and Accounting server 110 could assign to the mobile node 10 a Designated Home Agent and a Designated Home Address different from the required ones), and dynamically configures it in a step 208 (e.g. using the procedure defined in [ref. draft-giaretta-mip6-authorization-eap-00]). At the end of such communication, the Designated Home Agent 130 has allocated the necessary resources to manage the mobile node 10;

when the communication between server 110 and Designated Home Agent 130 is ended, in a step 210, the server 110 sends a Diameter message of Home Agent Relocation Answer to the Serving Home Agent 120 in which it inserts the following AVP attributes:

a) User-Name-AVP containing the Network Access Identifier of the mobile node 10;

b) Designated-Home-Agent-Address-AVP containing the address of the Designated Home Agent 130 allocated to the mobile node 10;

c) Designated-Home-Address-AVP containing the new Home Address of the mobile node 10;

d) Authorisation-Lifetime-AVP containing the lifetime, possibly equal to infinite, of the previous Home Address (Serving Home Address). This value shows the remaining time during which the mobile node 10 can go on using the Serving Home Agent together with the Designated Home Agent, to guarantee the survival of application sessions that were already active before starting the Home Agent reallocation procedure. In other words, this lifetime shows within how much time the Home Agent reallocation procedure must be fully completed;

the Serving Home Agent 120 receives these information and in a step 212 communicates them to the mobile node 10 including the HA-Relocation-Data-Mobility-Option in the Binding Acknowledgement (BA) message. Such option shows whether the procedure was successful through the Code field and contains the lifetime of the previous Home Address, the Designated Home Agent address and the new Home Address;

the mobile node 10 receives these information and in a step 214 negotiates an IPsec Security Association with the Designated Home Agent 130. Afterwards, the mobile node 10 can register itself with the Designated Home Agent 130 through Binding Update and Binding Acknowledgement messages, respectively designated by references 216 and 218 in FIG. 5. In this transient period, the mobile node 10 communicates by simultaneously using Serving Home Address and Designated Home Address.

Communications between Authentication, Authorisation and Accounting server and Designated Home Agent can be realised according to what is defined in [ref. draft-giaretta-mip6-authorization-eap-00, page 9-12].

As stated in [ref. rfc3775, page 18-19], the mobile node 10 and the Designated Home Agent 130 must share a IPsec Security Association 214 to protect the Mobile IPv6 signalling traffic.

As a preference, differently from what has been described in [ref. draft-giaretta-mip6-authorization-eap-00], the Authentication, Authorisation and Accounting server 110 does not send to the mobile node 10 a Pre-Shared Key (PSK) for the bootstrap of such IPsec Security Association through IKE (Internet Key Exchange) [ref. rfc2409].

The shared "secret" to establish the Security Association can in fact be derived from the authentication procedure, and, in particular, from the cryptographic material exported from by the employed EAP (Extensible Authentication Protocol) method. This supposing that the mobile node uses the EAP protocol [ref. rfc3748] for accessing the network and that the Authentication, Authorisation and Accounting server can safely communicate the PSK to the Designated Home Agent: an example on how such communication can happen is described in [ref. draft-giaretta-mip6-authorization-eap-00, page 11-12].

In case the Home Agent reallocation request coming from the mobile node 10 is not authorised, the whole procedure is described in FIG. 6:

in a step 220 the mobile node 10 receives a Router Advertisement with bit H set to 1 and decides to start a Home Agent reallocation procedure;

in a step 222 the mobile node 10 sends a Binding Update (BU) message to its own Serving Home Agent 120, in which it appends a new mobility option, called HA-Relocation-Hints-Mobility-Option;

in a step 224 the Home Agent 120 processes the Binding Update message as stated in [ref. rfc3775, page 88-92];

in a step 226 the Authentication, Authorisation and Accounting server 110 decides not to authorise the request;

in a step 228 the Authentication, Authorisation and Accounting server 110 replies to the Diameter message of Home Agent Relocation Request coming from the Serving Home Agent 120 by sending a Home Agent Relocation Answer message with a Result-Code-AVP equal to DIAMETER_AUTHORISATION_REJECTED [ref. rfc3588];

in a step 230 in turn the Serving Home Agent 120 communicates to the mobile node 10 the failure of the procedure through a HA-Relocation-Data-Mobility-Option containing the FAILURE value in the Code field.

The Home Agent reallocation procedure can be requested and started also by the Serving Home Agent; in particular, the Serving Home Agent can request the start of the procedure for a mobile node in case it begins being overloaded and has, consequently, difficulties in managing all mobile nodes registered with it.

FIG. 7 shows the procedure flow in case the request coming from the Serving Home Agent has been regularly authorised by the Authentication, Authorisation and Accounting server. The steps composing the procedure are as follows:

the Serving Home Agent 120 in a step 240 experiments a trigger that starts the procedure: as said, the most meaningful case is the one with Home Agent overload;

the Serving Home Agent 120 activates, in a step 242, the Home Agent reallocation procedure by sending to the Authentication, Authorisation and Accounting server 110 a Diameter message of HA Relocation Request, containing the Network Access Identifier of the mobile node that it would like to stop servicing and the corresponding Home Address. The mobile node is selected among those supporting the Home Agent reallocation procedure, namely among those that has sent a Binding Update with bit R equal to 1;

the Authentication, Authorisation and Accounting server 110 checks, in a step 244, that the Serving Home Agent is authorised to start the Home Agent reallocation procedure for the selected mobile node. If the answer is affirmative, the server 110 chooses, through a suitable algorithm, a Designated Home Agent 130 for that mobile node;

in a step 246 the server 110 negotiates with the Designated Home Agent 130 the Mobile IPv6 service and the corresponding resources to be allocated. This can be realised by using, for example, the procedure described in [draft-giaretta-mip6-authorization-eap-00];

in a step 248, once having completed the resource allocation procedure on the Designated Home Agent 130, the server 110 sends to the Serving Home Agent 120 a HA Relocation Answer message in which it inserts the following AVP attributes:
a) User-Name-AVP containing the Network Access Identifier of the mobile node 10;
b) Designated-Home-Agent-Address-AVP with the Designated Home Agent address;
c) Designated-Home-Address-AVP with the new Home Address;
d) Authorisation-Lifetime-AVP containing the lifetime of the previous Home Address;

as soon as the Serving Home Agent 120 receives, in a step 250, a Binding Update message from the user (in order to speed up the procedure, the Serving Home Agent can send a Binding Refresh Request, BRR, message requesting the mobile node 10 to immediately send a new Binding Update), it replies, in a step 252, with a Binding Acknowledgement message containing a HA-Relocation-Data-Mobility-Option. Such option contains the lifetime of the previous Home Address, the Designated Home Address and the new Home Address (namely the configuration data provided by the server 110 in the previous Diameter message of HA Relocation Answer). Also in this case, the PSK for bootstrapping the IPsec Security Association between mobile node and Home Agent is derived from EAP;

at that time, in a step 254, the mobile node 10 starts an IPsec Security Association with the Designated Home Agent and performs the Mobile IPv6 registration with it (namely the transmission of Binding Update and Binding Acknowledgement messages, respectively designated by references 256 and 258 in FIG. 7).

Also in this case, the Authentication, Authorisation and Accounting server 110 can decide not to authorise the Home Agent reallocation procedure requested by the Serving Home Agent; this is performed by sending to the Serving Home Agent a Diameter message of Home Agent Relocation Answer with Result-Code-AVP equal to DIAMETER_AUTHORIZATION_REJECTED.

FIG. 8 shows the Home Agent reallocation procedure in case it is started by the Authentication, Authorisation and Accounting server 110.

At least depending on experiences so far performed by the Applicant, this case is probably the most meaningful among the disclosed ones.

The Authentication, Authorisation and Accounting server 110 detects, normally during a re-authentication procedure, that the mobile node is far away in terms of IP hops from the Serving Home Agent and therefore would benefit from the assignment of a new Home Agent. Information about the mobile node position can be easily obtained starting from the IP address of the Network Access Server from which the user performed the re-authentication procedure.

The procedure comprises the following steps:

in a step 260 the server 110 selects a suitable Designated Home Agent, 130, and allocates the resources by following, for example, the approach described in [ref. draft-giaretta-mip6-authorization-eap-00];

once the server 110 in a step 262 has configured the Designated Home Agent 130, it sends in a step 264 a Diameter message of HA Relocation Activation Request to the Serving Home Agent 120 inserting the following AVP attributes:
a) User-Name-AVP containing the user's Network Access Identifier;
b) Serving-Home-Address-AVP containing the Home Address currently assigned to the mobile node;
c) Designated-Home-Agent-Address-AVP containing the Designated Home Agent address;
d) Designated-Home-Address-AVP containing the new Home Address assigned to the mobile node 10;
e) Authorisation-Lifetime-AVP containing the lifetime, possibly equal to infinite, of the previous Home Address (Serving Home Address);

in a step 266 the Serving Home Agent 120 immediately sends a Binding Refresh Request (BRR) message to the mobile node 10 in order to solicit the transmission of a Binding Update. The transmission of the BRR allows avoiding Diameter communication time-out problems between Serving Home Agent 120 and server 110, since, otherwise, it is not possible to deterministically provide when the next Binding Update will be received from the mobile node 10;

after having received, in a step 268, the Binding Update from the mobile node 10 that must carry out the Home Agent reallocation procedure, in the following Binding Acknowledgement, step 270, the Serving Home Agent 120 inserts a HA-Relocation-Data-Mobility-Option containing the lifetime of the previous Home Address, the Designated Home Agent address and the new Home Address;

in a step 272 the Serving Home Agent 120 replies to the server 110 with a Home Agent Relocation Activation Answer message, in which it points out that the mobile node 10 has received information for completing the procedure;

afterwards, the mobile node 10 can negotiate the IPsec Security Association with the Designated Home Agent 130, step 274, and perform the Mobile IPv6 registration with it, steps 276 and 278.

As pointed out previously, the mobile node communicates to the Serving Home Agent, by means of Binding Update messages, whether it supports the Home Agent reallocation procedure and the Mobility Options defined here. These information reach the Serving Home Agent and not the Authentication, Authorisation and Accounting server: for such reason, the Authentication, Authorisation and Accounting server can start a Home Agent reallocation procedure for a mobile node that in practice does not support such functionality.

Figure 9:
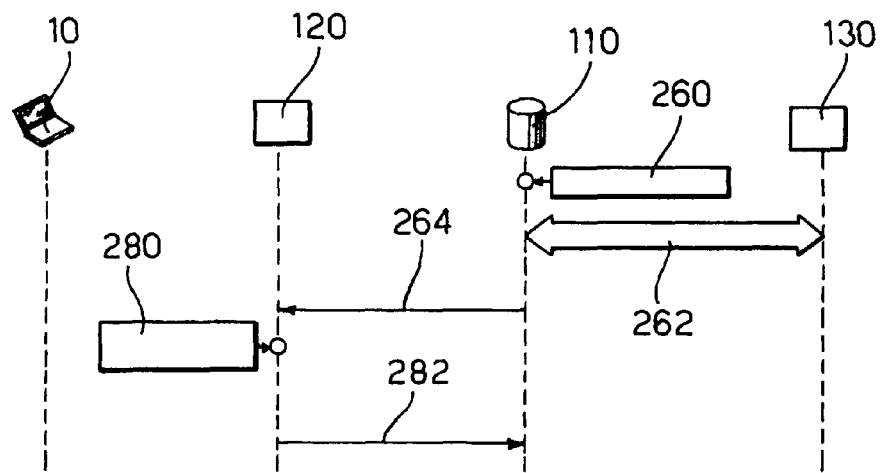
FIG. 9 shows a functional flow diagram representing a procedure for re-allocating the Home Agent started by the AAA server but failed since it was related to a mobile node that does not support the procedure.

In such case, in a step 280 in FIG. 9, the Serving Home Agent 120 becomes aware that the mobile node 10 does not support the requested functionality. In a step 282 the Serving Home Agent 120 communicates to the server 110 that the procedure cannot be carried out through a HA Relocation Activation Answer message with Result-Code-AVP equal to DIAMETER_UNABLE_TO_COMPLY.

Based on the previously defined procedure, following the exchange with the Serving Home Agent of the Binding Update and Binding Acknowledgement messages containing the new Mobility Option and the consequent registration with the Designated Home Agent, the mobile node has two Home Addresses associated with one or more Home Agents.

The way in which the mobile node manages the simultaneous presence of these two registrations and the criteria based on which it completely deletes the registration from the Serving Home Agent will now be described.

In this context, it is desirable that the Home Agent reallocation procedure has no influence on on-going communications.

For example, if the mobile node, as soon as the registration with the Designated Home Agent is ended, carried out the deletion of the registration with the Serving Home Agent, possible on-going sessions would not remain active, since identified by the Home Address related to the Serving Home Agent (namely the Serving Home Address).

The approach proposed in the herein-described arrangement is similar to the one used in IPv6 networks for stateless host configuration [ref. 2462].

The herein-described arrangement inserts a state machine that regulates the use of a Home Address and, in particular, points out whether the Home Address can be used only for already active communications or also for starting new communications.

The states that can be assumed by a Home Address are:
a first state, here called Preferred Home Address: it is an address for which there is no restriction of use for upper levels. This implies that such address can be used for starting new communications; in the herein-described procedure, a Home Address is in the Preferred state since when it is assigned to the mobile node till when the Home Agent reallocation procedure is completed by assigning a new Home Address (Designated Home Address);
a second state, here called Deprecated Home Address: it is an address whose use is allowed only for already activated communications; therefore, it cannot be used for starting new communications. The Home Address goes from Preferred state to Deprecated state when the Home Agent reallocation procedure is completed and the mobile node has registered itself with the Designated Home Agent; and
a third state, here called Invalid Home Address: an address in this state cannot be used by the mobile node neither for new communications nor for existing communications. The Home Address goes from Deprecated state to Invalid state when the mobile node has ended all communications previously activated with that address; to avoid that a Home Address remains in the Deprecated state for too much time (for example in case of communications with a very long duration), an address can pass to the Invalid state also following the elapse of a time-out (namely the lifetime pointed out by the Authentication, Authorisation and Accounting server in the Authorisation-Lifetime-AVP). It must be noted that, at the expiration of such time-out, that anyway should be characterised by a rather high value, possible communications linked to such address are stopped.

In order to ensure the correct operation of the procedure, it is important that the Authentication, Authorisation and Accounting server 110 gets to know when the procedure itself is completed: in particular, it is necessary to provide that the Authentication, Authorisation and Accounting server 110 is informed about when the mobile node is registered with the Designated Home Agent and when it deletes its registration with the Serving Home Agent. These information are made available to the Authentication, Authorisation and Accounting server 110 for two reasons:
they are used as confirmation of the correct operation of the procedure, in such a way that the Authentication, Authorisation and Accounting server 110 always knows the Home Agent that is serving a particular mobile node;
they can be used by the Authentication, Authorisation and Accounting server 110 to decide whether to authorise a new Home Agent reallocation procedure; for example, the Authentication, Authorisation and Accounting server 110 can decide not to authorise a mobile node or Serving Home Agent request in case the mobile node itself has not yet completed a previous Home Agent reallocation.

The proposed arrangement provides that these information are supplied to the Authentication, Authorisation and Accounting server 110 using the accounting Diameter messages; the procedure consists in the steps used in FIG. 10:
in a step 300 the mobile node 10 sends a Binding Update message to the Designated Home Agent 130;
in a step 302 the Designated Home Agent 130 replies to the mobile node 10 with a Binding Acknowledgement;
after the mobile node 10 has registered with the Designated Home Agent 130, in a step 304 the Designated Home Agent 130 itself sends to the server 110 an Accounting Start message to confirm the occurred registration; from this message, the server 110 comprises that the mobile node 10 has begun the actual Home Agent reallocation procedure and that the mobile node itself is registered with two different Home Agents (namely the Serving Home Agent and the Designated Home Agent);
in the period designated with 306, it happens that the mobile node 10 simultaneously uses Serving Home Agent 120 and Designated Home Agent 130;
in a step 308, the mobile node 10 sends to the Serving Home Agent 120 a Binding Update message with Lifetime equal to zero, in order to explicitly delete its own registration, and in a step 310 it receives the corresponding Binding Acknowledgement message. Alternatively, the mobile node 10 can let its own registration with the Serving Home Agent 120 spontaneously elapse, ceasing to periodically confirm its validity by sending Binding Update messages to the Serving Home Agent 120;

after having removed the state related to the mobile node 10, in a step 312, the Serving Home Agent 120 sends to the Authentication, Authorisation and Accounting server 110 a Diameter message of Accounting Stop, as it occurs for any Network Access Server. The server 110 understands from this message that the mobile node is not registered any more on the Serving Home Agent 120 and that, therefore, the Home Agent reallocation procedure is wholly ended.

As stated in [ref. rfc3775, page 18-19] it is necessary that mobile node and Home Agent establish an IPsec Security Association, for example by using Internet Key Exchange [ref. rfc2409], before exchanging any Binding Update or Binding Acknowledgement messages.

Differently from what is described in [ref. draft-giaretta-mip6-authorization-eap-00], in the herein-proposed arrangement it is provided that the Pre-Shared Key necessary for bootstrapping the Internet Key Exchange is not explicitly sent to the mobile node, but is derived from the mobile node itself based on the EAP key hierarchy.

The procedure to derive and use such key is described herein below.

At the end of the EAP communication, the mobile node 10 and the Authentication, Authorisation and Accounting server 110 share two keys derived from the particular authentication method being used: they are the Master Session Key (MSK) and the Extended Master Session Key (EMSK) [ref. draft-ietf-eap-keying-03, page 13-17]. This latter key can in turn be used to derive other keys, defined as Application Master Session Key (AMSK), that are directly used by the applications [ref. draft-ietf-eap-keying-03, page 13-17]; in particular, it is possible to derive an Application Master Session Key specific for Mobile IPv6 that can be used as PSK in IKE phase 1.

Such key is derived from the EMSK both by the mobile node 10 and by the Authentication, Authorisation and Accounting server 110; this latter one must afterwards communicate it to the Home Agent. Such communication can be performed through the Diameter protocol, for example with the approach defined in [ref. draft-giaretta-mip6-authorization-eap-00].

A possible function for deriving from the EMSK a AMSK for Mobile IPv6 is the following:

KDF (K,L,D,O)=T1|T2|T3|T4 . . .
T1=prf (K, S|0x01)
T2=prf (K, T1|S|0x02)
T3=prf (K, T2|S|0x03)
where
prf=HMAC–SHA1
K=EMSK
L=key label="MIPv6 Key"
D=application data=Home Agent Address
O=OutputLength (2 bytes)
S=L|"\0"|D|O Herein below a procedure is described that can be used by the Authentication, Authorisation and Accounting server 110 to choose the Designated Home Agent 130 to be assigned to the mobile node during the Home Agent reallocation procedure.

The approach is based on the division of the operator's access network into different zones, each one characterized by the presence of one or more Home Agents as shown in FIG. 11.

The mobile node 10 that can be found in the zone 400 is normally managed by the Home Agent 410 corresponding to such zone; following a movement that implies a zone change, 420 or 440, the network must decide whether the affected zones are enough far away to justify the start of a Home Agent reallocation procedure.

In addition to the zones into which the access network is divided, it can be useful to define one or more roaming zones 460 comprising the Home Agents 470 dedicated to managing the users that are roaming in the networks of other providers 480. FIG. 11 shows such Home Agents 470 as placed inside the backbone network 490 next to the interconnection points with other networks.

To manage the Home Agent reallocation procedures through this approach, the server 110, possibly referring to a centralised data-base 500 (e.g. a LDAP data-base), preferably keeps the following data structures:

Zone Table: in this table, the Authentication, Authorisation and Accounting server 110 keeps the list of zones into which the access network has been divided and the possible roaming zones;

Network Access Server Table: in this table, the Authentication, Authorisation and Accounting server 110 keeps the identifier of every Network Access Server 510 being present in the network (e.g. router, Access Point) and a list of information linked thereto, among which in particular the IP address and the zone to which it belongs;

Home Agent Table: for every Home Agent, an identifier is kept (e.g. IP address, Network Access Identifier) together with other information both on node characteristics (type, maximum capacity, etc.) and on current node load level (namely number of served users, that can be updated depending on Accounting information). Moreover, in this table the Authentication, Authorisation and Accounting server 110 keeps information about the zone served by every Home Agent.

From information contained in these data structures, the Authentication, Authorisation and Accounting server 110 is able to timely know in which zone a particular mobile node can be found, the zone to which its Serving Home Agent belongs and the global network situation. These information however can be not enough to decide when it is convenient, or even necessary, to perform the Home Agent reallocation procedure; for such purpose, a metrics is determined that allows providing an indication of the distance between zones and depending on such metrics deciding whether to start the procedure.

An example of static metrics for the network in FIG. 11 and its use for the purpose of taking a final decision about executing the procedure is shown in FIG. 12. The table rows represent possible zones (400, 420, 440, 460) pertaining to the Serving Home Agent, while the columns similarly represent the zones in which the mobile node can be found during its movements. Each box contains a value representing the distance that separates the row-associated zone from the column-associated zone. By referring to this table, the Authentication, Authorisation and Accounting server 110 can obtain at any time the metrics associated with the distance from the zone pertaining to the Serving Home Agent to the zone in which the mobile node can be found. Depending on the value of such metrics, the server 110 can decide whether to start or not the Home Agent reallocation procedure. As an example, it is possible to assume a metrics on three levels (1, 2 and 3) having the following meaning:

1=the Home Agent reallocation procedure is not required (namely the zone pertaining to the Serving Home Agent coincides with the zone in which the mobile node can be found, or anyway the two zones are very near in terms of number of IP hops);

2=the Home Agent reallocation procedure is optional (namely the zone pertaining to the Serving Home Agent does not coincide with the zone in which the mobile node can be found, but anyway the two zones are not spaced apart enough to make it strictly necessary to use the Home Agent reallocation procedure);

3=the Home Agent reallocation procedure is compulsory (namely the zone pertaining to Serving Home Agent is so far away from the zone in which the mobile node can be found that the recourse to the Home Agent reallocation procedure is strongly advised).

An alternative arrangement provides for dynamically updating the metrics depending on the instantaneous network load, that can be evaluated through the Round Trip Time (RTT) estimate among different Home Agents and RTT among the mobile nodes being present in every zone and the corresponding Serving Home Agents.

Herein below the format of previously-defined Mobility Options and AVP (Attribute Value Pair) attributes is included.

FIG. 13 shows the Binding Update message format, in which bit 600 is pointed out, defined by the herein-described arrangement: bit 600 (R) is set to 1 by the mobile node if it supports the Home Agent reallocation procedure.

FIG. 14 shows the format of a generic Mobility Option, as specified in [ref. rfc3775, page 46-47]; as can be noted, it is a format of the TLV (Type, Length, Value) type with the presence of Type 610, Length 620 and Data 630 fields.

FIG. 15 shows the Home-Agent-Relocation-Data-Mobility-Option. The defined fields are as follows:
field 640 (Code): it shows the procedure result. This field can assume the following values:
  i) 0=Success
  ii) 128=Failure
field 642 (Reserved): field reserved for future uses;
field 644 (Lifetime): this field points out the value in units of four seconds of the lifetime of the Home Address currently allocated to the mobile node (the Home Address related to the Serving Home Agent, namely the Serving Home Address). This value can also be infinite;
field 646 (Home Address): it contains the new Home Address allocated to the user (namely the Designated Home Address);
field 648 (Home Agent Address): it contains the Designated Home Agent address.

FIG. 16 shows the format of the Home-Agent-Relocation-Hints-Mobility-Option.

It can be noted that it shows the Home Address 646 and Home Agent Address 648 fields already introduced for the Home-Agent-Relocation-Data-Mobility-Option. These fields can contain a null value in case the mobile node requests a Home Agent reallocation procedure without having received any Router Advertisement with bit H=1.

The Diameter messages used in the arrangement proposed here are as follows:
Home Agent Relocation Request. This message is sent by the Serving Home Agent to the Authentication, Authorisation and Accounting server for requesting the start of the Home Agent reallocation procedure; it contains the following AVP attributes:
User-Name-AVP;
Serving-Home-Address-AVP;
Designated-Home-Address-AVP (optional);
Designated-Home-Agent-Address-AVP (optional).
Home Agent Relocation Answer. This message is sent by the Authentication, Authorisation and Accounting server to the Serving Home Agent to communicate new configuration parameters that have to be delivered to the mobile node as part of the Home Agent reallocation procedure; it contains the following AVP attributes:
User-Name-AVP;
Designated-Home-Address-AVP;
Designated-Home-Agent-Address-AVP;
Authorisation-Lifetime-AVP.
Home Agent Relocation Activation Request. This message is sent by the Authentication, Authorisation and Accounting server in case it proposes to the Serving Home Agent a Home Agent reallocation procedure for a particular mobile node; it contains the following AVP attributes:
User-Name-AVP;
Serving-Home-Address-AVP;
Designated-Home-Address-AVP;
Designated-Home-Agent-Address-AVP;
Authorisation-Lifetime-AVP.
Home Agent Relocation Activation Answer. This message is sent by the Serving Home Agent to communicate to the Authentication, Authorisation and Accounting server that the mobile node has been warned about the need of performing the Home Agent reallocation procedure; it contains the following AVP attributes:
User-Name-AVP;
Result-AVP.

The AVP attributes used and/or defined in this document are the following (the description is based on conventions and data types specified in [ref. rfc3588]):
User-Name-AVP (AVP Code 1). This AVP contains the user's user-name expressed in the form of a Network Access Identifier. The AVP is of the UTF8String type.
Serving-Home-Address-AVP. The AVP Data field of this AVP is of the IPAddress type and contains the Home Address related to the Serving Home Agent.
Designated-Home-Address-AVP. The AVP Data field of this AVP is of the IPAddress type and contains the Home Address related to the Designated Home Agent.
Designated-Home-Agent-Address-AVP. The AVP Data field of this AVP is of the IPAddress type and contains the Designated Home Agent address.
Authorisation-Lifetime-AVP (AVP Code 291). This AVP is of the Unsigned32 type; the value contained in the AVP Data field represents the lifetime in seconds of the authorisation to use the services for a certain user. In case of the Home Agent reallocation procedure, this value points out the remaining time during which the mobile node can go on using the Serving Home Agent together with the Designated Home Agent, to guarantee the survival of application sessions that were already active before the start of the Home Agent reallocation procedure.

The described Home Agent reallocation procedure has been detailed taking into account a particular scenario characterised in this way:
the mobile node authentication to authorise network access is realised through an EAP method (e.g. EAP-SIM, EAP-AKA) that is able to export keys that can be used by other applications;
the mobile node movements between different IP sub-networks are managed through the Mobile IPv6 protocol, that guarantees the survival of application sessions across mobility events;
the signalling messages exchanged between mobile node and Home Agent are protected (namely authentication, integrity and confidentiality) through an IPsec Security Association;

the IPsec Security Association between mobile node and Home Agent is dynamically established through the IKE protocol;

the communication between the Authentication, Authorisation and Accounting server and the Home Agents being present in the network (namely Serving Home Agent and Designated Home Agent) is realised through the Diameter protocol.

The procedure of the described arrangement, however, can be extended, for example and without limitation, to situations in which:

the mobile node authentication is realised through methods other than EAP, but anyway able to generate (on the mobile node and on the Authentication, Authorisation and Accounting server) cryptographic material that can be used by other applications (e.g. Mobile IP);

the mobile node movements are managed by using the Mobile IPv4 protocol [ref. rfc3344], or other mobility management protocols based on similar architectural principles;

signalling messages exchanged between mobile node and Home Agent are protected through a mechanism that is different from IPsec (e.g. the arrangement described in [ref. draft-ietf-mip6-auth-protocol-00]), but anyway based on the existence of a shared secret (e.g. Pre-Shared Key) between mobile node and home agent the IPsec Security Association between mobile node and Home Agent (Serving or Designated one) is dynamically established through the IKEv2 protocol [ref. draft-ietf-ipsec-ikev2-15], or other mechanisms that allow performing the bootstrap of an IPsec Security Association starting from a shared secret (e.g. Pre-Shared Key);

the communication between Authentication, Authorisation and Accounting server and Home Agent (Serving Home Agent and Designated Home Agent) is realised using any other protocol that is able to manage the transport of generic information contents (RADIUS, SNMP, etc.).

Consequently, without departing from the inventive principle, the constructive parts and the embodiments can change, even greatly, with respect to what is described and shown, merely as a non-limiting example of possible embodiments of the invention, without thereby departing from the scope of the invention, as defined by the claims that follow.

The invention claimed is:

1. A method for providing communication services to at least one mobile terminal in a communication network comprising a plurality of home agents, wherein said at least one mobile terminal uses at least one address to be served by a home agent identified within said plurality and said services are provided to said at least one mobile terminal within working sessions, comprising the steps of:

providing, in said communication network, an authentication, authorization and accounting platform;

selecting through said authentication, authorization and accounting platform, while said at least one mobile terminal is served by a first home agent in said plurality, a second home agent for serving said at least one mobile terminal;

reallocating the supply of said services to said at least one mobile terminal from said first home agent to said second home agent, wherein the reallocating comprises sending from said authentication, authorization and accounting platform to said at least one mobile terminal through said first home agent configuration information for configuring said at least one mobile terminal for accessing said services through said second home agent;

reallocating the supply of said communication services to said at least one mobile terminal from a first home agent to a second home agent of said plurality ensuring the survival of on-going application sessions;

pointing out through a status function the fact that said address used by said at least one mobile terminal for communications with said first home agent is configured to be used to start new communications and/or only for ending the existing communications to ensure the survival of said current application sessions;

assigning to said status function at least one value selected from the group of:

a first value identifying that said address can be used to start new communications, a second value identifying that said address can be used only for existing communications, and a third value identifying that said address cannot be used either for new communications or for existing communications;

when said status function has said first value, assigning to said at least one mobile terminal a new address for communicating with said second home agent, thereby switching said status function from said first value to said second value; and switching said status function from said second value to said third value when said at least one mobile terminal has ended all communications previously activated depending on the address used for communications with said first home agent.

2. The method according to claim 1, comprising the step of sending from said authentication, authorization and accounting platform to said second home agent configuration information for configuring said second home agent to allow the supply of said services to said at least one mobile terminal.

3. The method according to claim 2, wherein said configuration information sent to said second home agent comprises parameters selected from the group of:

an identifier of said at least one mobile terminal, a new address assigned to said at least one mobile terminal for communications with said second home agent, and the necessary parameters for activating a security association that can be used in communications between said at least one mobile terminal and said second home agent.

4. The method according to claim 2, comprising the step of establishing a security association for protecting communications between said at least one mobile terminal and said second home agent through the steps of:

sending, from said authentication, authorization and accounting platform to said second home agent, at least one secret to establish said security association; and deducing said secret from said at least one mobile terminal from the authentication procedure performed with said authentication, authorization and accounting platform.

5. The method according to claim 1, comprising the step of reallocating the supply of said communication services to said at least one mobile terminal from a first home agent to a second home agent of said plurality, the reallocation being started by said at least one mobile terminal.

6. The method according to claim 5, wherein said reallocation is subjected to a consent message from said authentication, authorization and accounting platform.

7. The method according to claim 1, comprising the step of reallocating the supply of said communication services to said at least one mobile terminal from a first home agent to a second home agent of said plurality, the reallocation being started by said first home agent.

8. The method according to claim 7, wherein said reallocation is subjected to a consent message from said authentication, authorization and accounting platform.

9. The method according to claim 1, comprising the step of reallocating the supply of said communication services to said at least one mobile terminal from a first home agent to a second home agent of said plurality, the reallocation being started by said authentication, authorization and accounting platform.

10. The method according to claim 1, comprising the step of reallocating the supply of said communication services to said at least one mobile terminal from a first home agent to a second home agent of said plurality when at least one condition occurs selected from the group of: said at least one mobile terminal detects that said second home agent is configured to provide said communication services with better performances with respect to said first home agent, said first home agent detects the occurrence of an overload situation, and said authentication, authorization and accounting platform detects that said second home agent is configured to provide to said at least one mobile terminal said communication services with better performances with respect to said first home agent.

11. The method according to claim 1, wherein said configuration information sent to said at least one mobile terminal through said first home agent comprises parameters selected from the group of:
address of said second home agent,
a new address assigned to said at least one mobile terminal for communications with said second home agent, and
the lifetime, possibly equal to infinite, of the address used by said at least one mobile terminal for communications with said first home agent.

12. The method according to claim 1, comprising the step of forcing the passage of said status function from said second value to said third value when a timeout interval elapses.

13. The method according to claim 1, comprising the step of configuring said network as network where the terminal mobility is managed with a mobile IP protocol.

14. A system for providing communication services to at least one mobile terminal in a communication network, comprising a plurality of home agents, wherein said at least one mobile terminal uses at least one address to be served by a home agent identified within said plurality, said services being provided to said at least one mobile terminal within working sessions, comprising:
an authentication, authorization and accounting platform, wherein said authentication, authorization and accounting platform is configured for:
selecting, while said at least one mobile terminal is served by a first home agent in said plurality, a second home agent for serving said at least one mobile terminal; and
reallocating the supply of said services to said at least one mobile terminal from said first home agent to said second home agent by sending to said at least one mobile terminal through said first home agent configuration information for configuring said at least one mobile terminal for accessing said services through said second home agent;
a first home agent and a second home agent of said plurality, the supply of said communication services to said at least one mobile terminal being able to be reallocated from said first to said second home agent ensuring the survival of on-going application sessions;
associated with the address used for communications between said at least one mobile terminal and said first home agent, a status function that points out that said address is configured to be used to start new communications and/or to end existing communications to ensure the survival of the current application sessions;
wherein said status function is configured to assume at least one value selected from the group of:
a first value identifying that said address can be used to start new communications,
a second value identifying that said address can be used only for existing communications, and
a third value identifying that said address cannot be used either for new communications or for existing communications; and
wherein the system is further configured to:
when said status function has said first value, assign to said at least one mobile terminal a new address for communicating with said second home agent, thereby switching said status function from said first value to said second value, and
switch said status function from said second value to said third value when said at least one mobile terminal has ended all communications previously activated depending on the address used for communications with said first home agent.

15. The system according to claim 14, wherein said authentication, authorization and accounting platform is configured to send to said second home agent configuration information for configuring said second home agent to allow the supply of said services to said at least one mobile terminal.

16. The system according to claim 15, wherein said configuration information sent to said second home agent comprises parameters selected from the group of:
an identifier of said at least one mobile terminal,
a new address assigned to said at least one mobile terminal for communications with said second home agent, and
the necessary parameters for activating a security association that can be used in communications between said at least one mobile terminal and said second home agent.

17. The system according to claim 15, wherein the system is configured for establishing a security association for protecting communications between said at least one mobile terminal and said second home agent, the system comprising said authentication, authorization and accounting platform configured for sending to said second home agent at least one secret to establish said security association, and for deducing said secret from said at least one mobile terminal from the authentication procedure performed with said authentication, authorization and accounting platform.

18. The system according to claim 14, comprising a first home agent and a second home agent of said plurality, the supply of said communication services to said at least one mobile terminal being able to be reallocated from said first to said second home agent, the reallocation being configured to be started by said at least one mobile terminal.

19. The system according to claim 18, wherein said reallocation is subjected to a consent message from said authentication, authorization and accounting platform.

20. The system according to claim 14, comprising a first home agent and a second home agent of said plurality, the supply of said communication services to said at least one mobile terminal being able to be reallocated from said first to said second home agent, the reallocation being configured to be started by said first home agent.

21. The system according to claim 20, wherein said reallocation is subjected to a consent message from said authentication, authorization and accounting platform.

22. The system according to claim 14, comprising a first home agent and a second home agent of said plurality, the supply of said communication services to said at least one mobile terminal being able to be reallocated from said first to said second home agent, the reallocation being configured to be started by said authentication, authorization and accounting platform.

23. The system according to claim 14, comprising a first home agent and a second home agent of said plurality, the supply of said communication services to said at least one mobile terminal being able to be reallocated from said first to said second home agent upon the occurrence of at least one condition selected from the group of: said at least one mobile terminal detects that said second home agent is configured to provide said communication services with better performances with respect to said first home agent, said first home agent detects the occurrence of an overload situation, and said authentication, authorization and accounting platform detects that said second home agent is configured to provide to said at least one mobile terminal said communication services with better performances with respect to said first home agent.

24. The system according to claim 14, wherein said configuration information sent to said at least one mobile terminal through said first home agent comprises parameters selected from the group of:
 address of said second home agent,
 a new address assigned to said at least one mobile terminal for communications with said second home agent, and
 the lifetime, possibly equal to infinite, of the address used by said at least one mobile terminal for communications with said first home agent.

25. The system according to claim 14, wherein the system is configured for forcing the passage of said status function from said second value to said third value when a timeout interval elapses.

26. A communications network comprising a plurality of home agents for providing communication services to at least one mobile terminal, wherein said at least one mobile terminal is served by a home agent identified within said plurality and said services are provided to said at least one mobile terminal within working sessions, comprising a system according to claim 14.

27. A network according to claim 26, wherein said network is a network wherein the terminal mobility is managed with mobile IP protocol.

28. A non-transitory computer readable medium encoded with a computer program product loadable into a memory of at least one electronic computer and comprising portions of software code for performing the method according to claim 1.

\* \* \* \* \*